United States Patent
Takeda

(10) Patent No.: US 12,338,013 B2
(45) Date of Patent: Jun. 24, 2025

(54) UNMANNED AERIAL VEHICLE SUPPORT DEVICE AND UNMANNED AERIAL VEHICLE SUPPORT SYSTEM

(71) Applicant: Hitachi Industrial Equipment Systems Co., Ltd., Tokyo (JP)

(72) Inventor: Kenji Takeda, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 18/719,857

(22) PCT Filed: Nov. 29, 2022

(86) PCT No.: PCT/JP2022/043921
§ 371 (c)(1),
(2) Date: Jun. 14, 2024

(87) PCT Pub. No.: WO2023/203807
PCT Pub. Date: Oct. 26, 2023

(65) Prior Publication Data
US 2025/0042580 A1    Feb. 6, 2025

(30) Foreign Application Priority Data
Apr. 20, 2022    (JP) ................. 2022-069784

(51) Int. Cl.
*B64U 70/50* (2023.01)
*H02M 7/5387* (2007.01)
(Continued)

(52) U.S. Cl.
CPC .......... *B64U 70/50* (2023.01); *H02M 7/5387* (2013.01); *B64U 2201/20* (2023.01); *H02J 3/38* (2013.01);
(Continued)

(58) Field of Classification Search
CPC ............... B64U 70/50; B64U 2201/20; B64U 2101/64; B64U 10/13; B64U 50/19;
(Continued)

(56) References Cited

U.S. PATENT DOCUMENTS 9,718,564 B1 * 8/2017 Beckman ................. G08G 5/57
10,112,712 B1 * 10/2018 Gentry .................... B60L 53/51
(Continued)

FOREIGN PATENT DOCUMENTS

JP    2018-528123 A    9/2018
JP    2021-160887 A    10/2021
(Continued)

OTHER PUBLICATIONS

International Search Report PCT/JP2022/043921 dated Jan. 31, 2023.

*Primary Examiner* — Medhat Badawi
(74) *Attorney, Agent, or Firm* — MATTINGLY & MALUR, PC

(57) ABSTRACT

The consumption of stored energy by an unmanned aerial vehicle is reduced by raising the unmanned aerial vehicle through an unmanned aerial vehicle support device, and accordingly, the cruising distance is increased. An unmanned aerial vehicle support device 10 includes a loading unit 1 and a control unit that controls raising and lowering of the loading unit. The loading unit 1 is raised to a predetermined height to enable the unmanned aerial vehicle 100 to take off. An unmanned aerial vehicle support system includes a server 5 that can communicate with the unmanned aerial vehicle support device 10 and selects a route on which the unmanned aerial vehicle 100 flies and one or more unmanned aerial vehicle support devices 10 on the route based on movement information including at least (Continued)

a departure point and a destination of the unmanned aerial vehicle input from the outside.

12 Claims, 13 Drawing Sheets

(51) Int. Cl.
  *H02J 3/38* (2006.01)
  *H02P 27/00* (2006.01)
(52) U.S. Cl.
  CPC ....... *H02J 2300/20* (2020.01); *H02J 2310/40* (2020.01); *H02P 27/00* (2013.01)
(58) Field of Classification Search
  CPC . B64U 2101/60; B64U 80/82; H02M 7/5387; H02J 3/38; H02J 2300/20; H02J 2310/40; H02P 27/00; B64C 27/04; B64C 39/02; B64F 1/12
  See application file for complete search history.

(56) References Cited

U.S. PATENT DOCUMENTS

| | | | | |
|---|---|---|---|---|
| 10,336,543 | B1* | 7/2019 | Sills | G05D 1/0094 |
| 11,691,756 | B1* | 7/2023 | Ludington | G06K 7/1408 |
| | | | | 701/16 |
| 2008/0226284 | A1* | 9/2008 | Coppola | F16M 11/42 |
| | | | | 396/428 |
| 2015/0129716 | A1* | 5/2015 | Yoffe | B64F 1/029 |
| | | | | 244/110 C |
| 2018/0130017 | A1* | 5/2018 | Gupte | G06Q 10/0836 |
| 2018/0245365 | A1* | 8/2018 | Wankewycz | B64U 10/13 |
| 2018/0265295 | A1* | 9/2018 | Beckman | G08G 5/57 |
| 2018/0265296 | A1* | 9/2018 | Beckman | B64U 70/90 |
| 2019/0302809 | A1* | 10/2019 | High | G05D 1/106 |
| 2020/0140121 | A1* | 5/2020 | Kim | H04L 5/0053 |
| 2020/0148374 | A1* | 5/2020 | Kawai | B64D 27/24 |
| 2020/0349853 | A1* | 11/2020 | Speasl | B64U 80/70 |
| 2021/0182996 | A1* | 6/2021 | Cella | G06Q 10/0637 |
| 2021/0380015 | A1* | 12/2021 | Nakaishi | H02J 7/0047 |
| 2022/0036302 | A1* | 2/2022 | Cella | G06N 20/00 |
| 2022/0306307 | A1* | 9/2022 | Tsutsumi | B60L 58/13 |
| 2023/0123322 | A1* | 4/2023 | Cella | G06Q 10/067 |
| | | | | 700/29 |
| 2023/0206172 | A1* | 6/2023 | Kashi | G06Q 10/0836 |
| | | | | 705/339 |
| 2023/0249839 | A1* | 8/2023 | Matsumoto | B60L 53/00 |
| | | | | 701/22 |
| 2023/0278720 | A1* | 9/2023 | Haga | B64D 27/357 |
| | | | | 701/3 |
| 2024/0037487 | A1* | 2/2024 | Clise | B64D 1/12 |
| 2024/0419190 | A1* | 12/2024 | Hattori | G05D 1/692 |
| 2025/0042580 | A1* | 2/2025 | Takeda | B64U 70/50 |

FOREIGN PATENT DOCUMENTS

| | | |
|---|---|---|
| KR | 10-2021-0134148 A | 11/2021 |
| WO | 2019/135271 A1 | 7/2019 |

* cited by examiner

F I G. 2
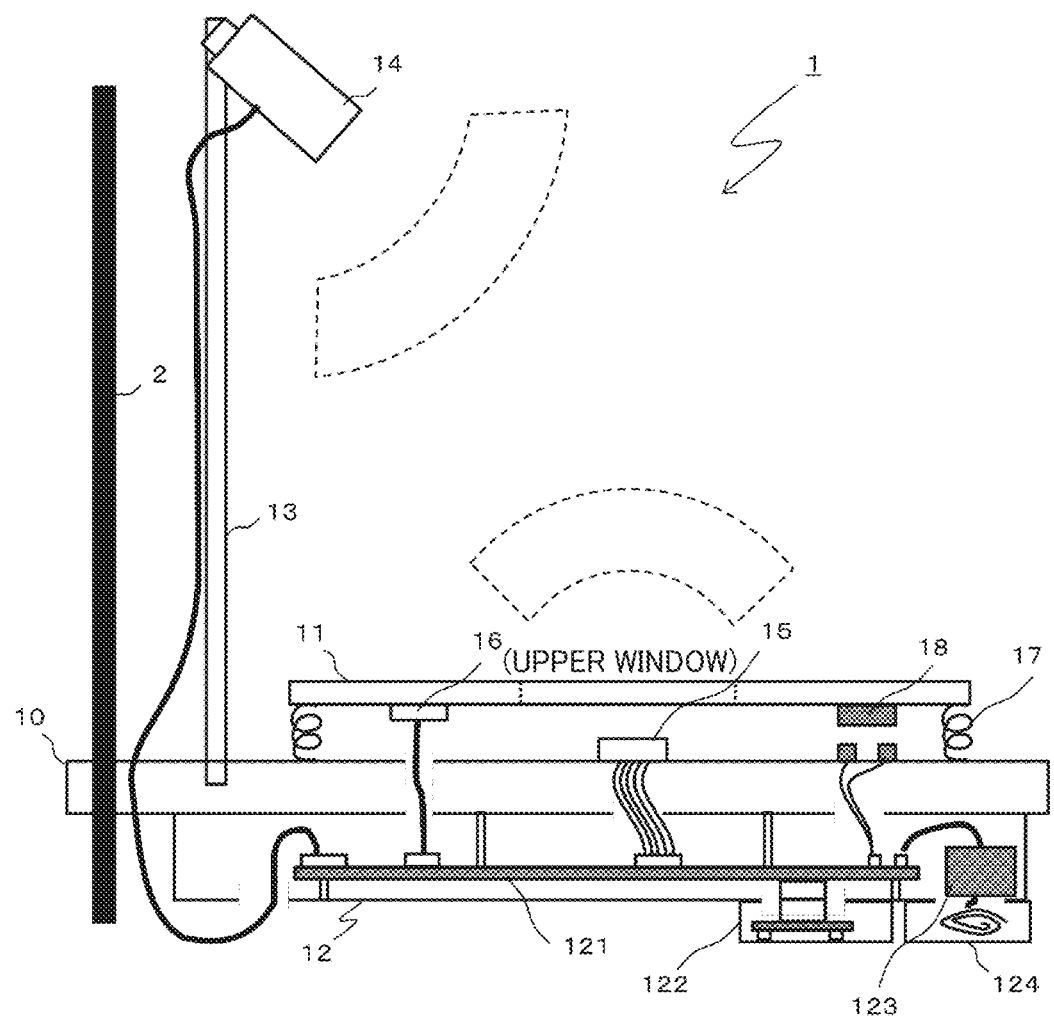

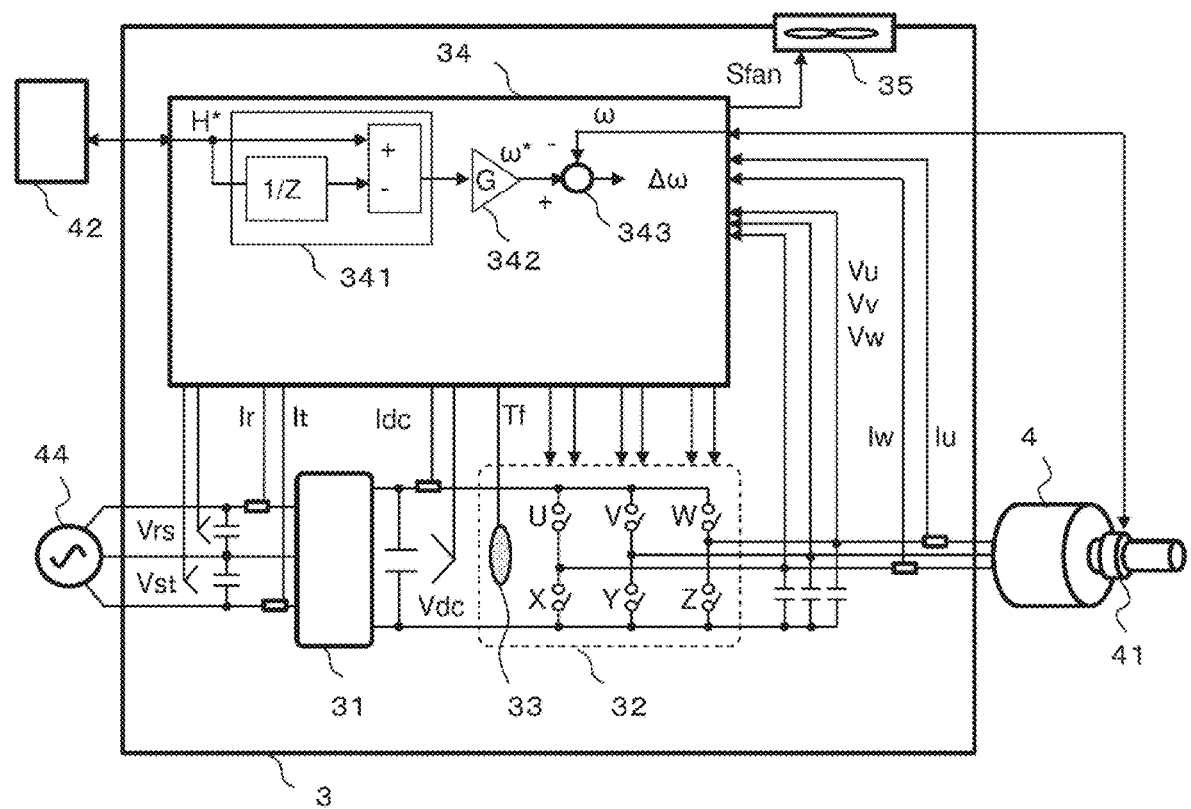
F I G. 3

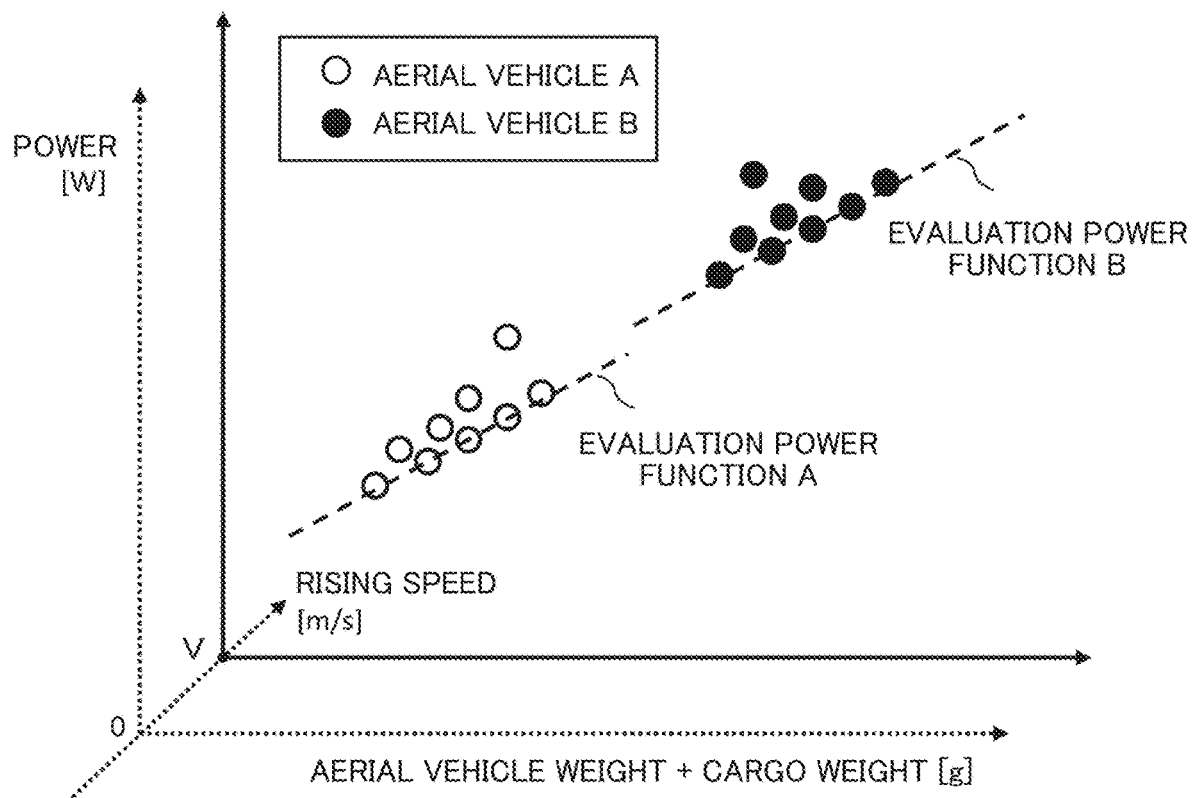
F I G. 5

F I G. 6
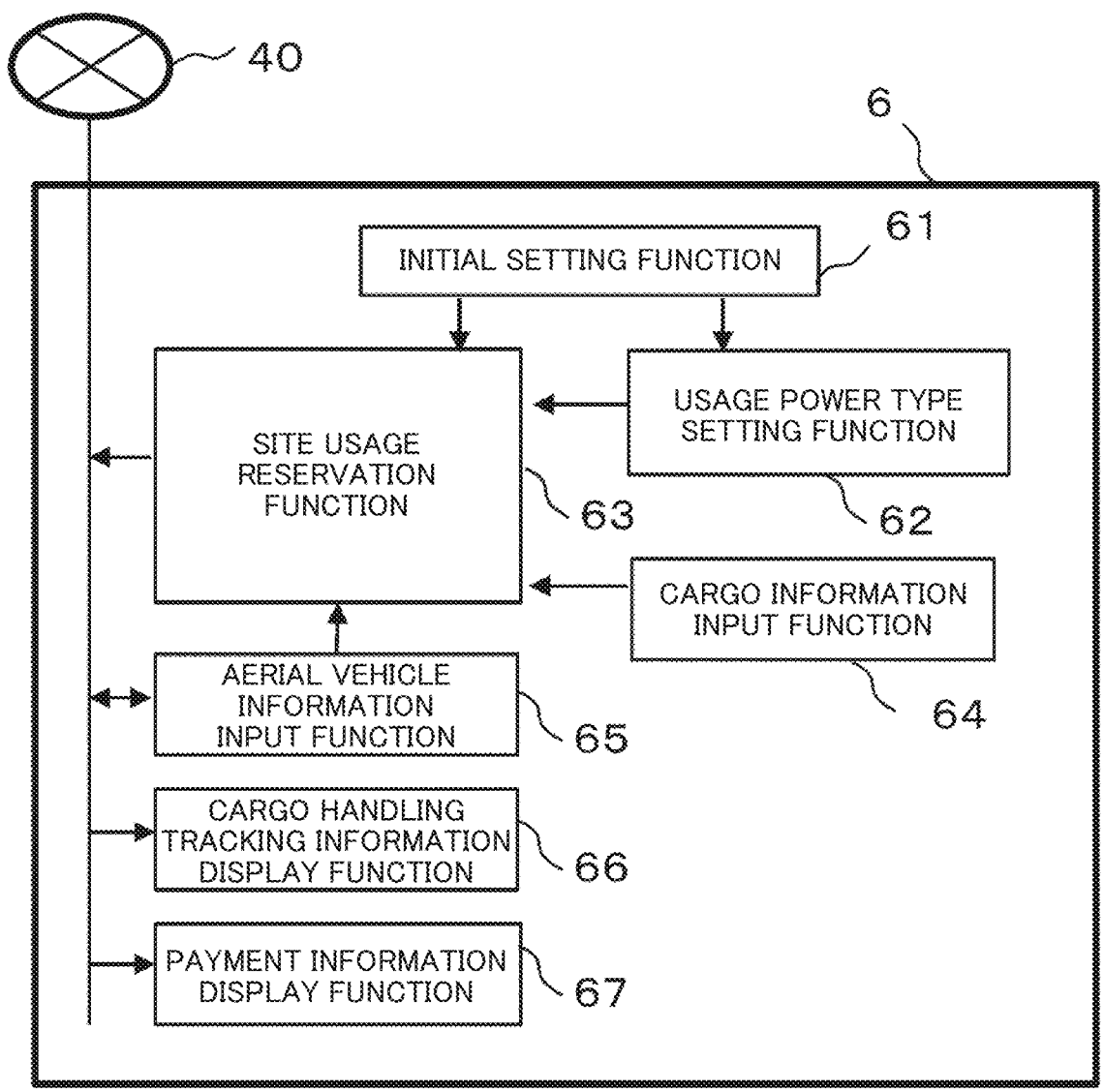

UNMANNED AERIAL VEHICLE SUPPORT DEVICE AND UNMANNED AERIAL VEHICLE SUPPORT SYSTEM

TECHNICAL FIELD

The present invention relates to an unmanned aerial vehicle support device and an unmanned aerial vehicle support system for supporting delivery using unmanned aerial vehicles.

BACKGROUND ART

In recent years, technology for delivering goods using an unmanned aerial vehicle (UAV) represented by a drone has been progressing.

As background technology in this technical field, there is JP 2021-160887 A (Patent Document 1). Patent Document 1 shows an example of a delivery base for deliveries using drones.

CITATION LIST

Patent Document

Patent Document 1: JP 2021-160887 A

SUMMARY OF THE INVENTION

Problems to be Solved by the Invention

In delivery using unmanned aerial vehicles, it is desirable to increase the size and weight of goods that can be delivered and to increase the cruising distance for delivery to the longer distance. In general, in order to achieve these performances, not only the aerodynamic performance of unmanned aerial vehicles but also the weight energy density of storage batteries for supplying power to the unmanned aerial vehicles is an important technical issue.

Patent Document 1 shows a case in which a drone port with a top opening for arrival and departure and a bottom opening for receiving deliveries is provided at the delivery base of a delivery company. The drone port disclosed in Patent Document 1 has a configuration in which a lifting device is provided in the lower layer to raise and lower goods at the delivery base, and it is possible to send and receive goods to and from drones. Patent Document 1 does not take into account the impact of the consumption of stored energy by unmanned aerial vehicles during delivery. For this reason, there are problems in that applicable delivery services are limited by the cruising distance and the cargo weight is also limited.

The present invention has been made in view of the above problems, and it is an object of the present invention to reduce the consumption of stored energy by the unmanned aerial vehicle and to increase the cruising distance by raising an unmanned aerial vehicle through an unmanned aerial vehicle support device.

Solutions to Problems

An example of an "unmanned aerial vehicle support device" of the present invention for achieving the aforementioned object is an unmanned aerial vehicle support device including: a loading unit on which an unmanned aerial vehicle is loaded; and a control unit that controls raising and lowering of the loading unit. The loading unit is raised to a predetermined height to enable the unmanned aerial vehicle to take off.

In addition, an example of an "unmanned aerial vehicle support system" of the present invention is an unmanned aerial vehicle support system including: an unmanned aerial vehicle support device that includes a loading unit on which an unmanned aerial vehicle is loaded and a control unit that controls raising and lowering of the loading unit and raises the loading unit to a predetermined height to enable the unmanned aerial vehicle to take off; and a server that is able to communicate with the unmanned aerial vehicle support device and selects a route on which the unmanned aerial vehicle flies and one or more unmanned aerial vehicle support devices on the route based on movement information including at least a departure point and a destination of the unmanned aerial vehicle input from an outside.

Effects of the Invention

According to the present invention, by making the unmanned aerial vehicle fly from the high altitude, it is possible to reduce the consumption of stored energy required for raising the unmanned aerial vehicle and accordingly increase the cruising distance.

Issues, configurations, and effects other than those described above will be clarified by the description of the following embodiments.

BRIEF DESCRIPTION OF THE DRAWINGS

FIG. 2 is a cross-sectional view in the horizontal direction of a loading unit of the unmanned aerial vehicle support device according to the first embodiment.

FIG. 3 is a detailed diagram of an inverter according to the first embodiment.

FIG. 5 is a schematic diagram of an example of power correction calculation in a power correction means according to the first embodiment.

FIG. 6 is a functional block diagram of a service user terminal according to a second embodiment.

MODE FOR CARRYING OUT THE INVENTION

Figure 1:
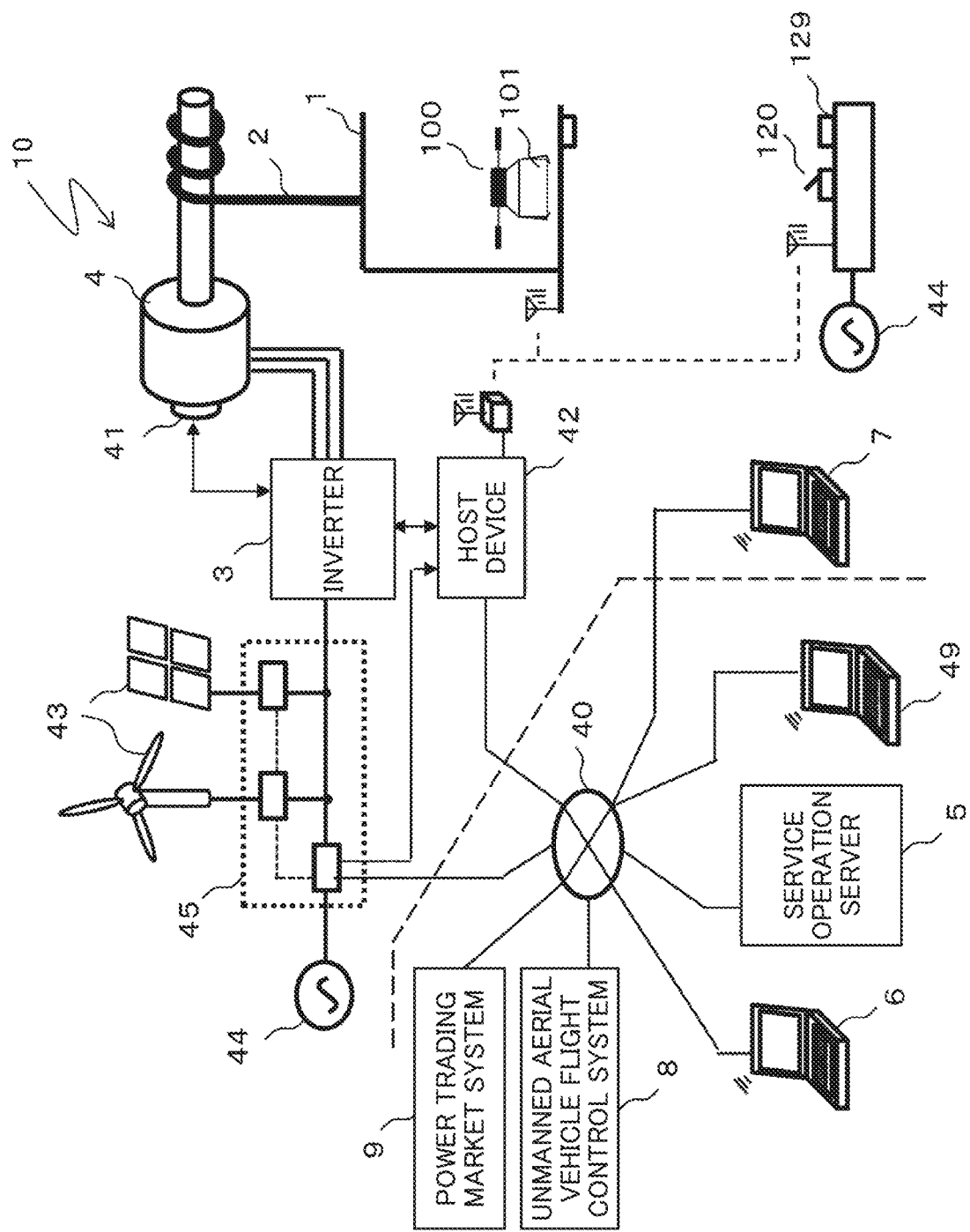
FIG. 1 is a configuration diagram of an unmanned aerial vehicle support system according to a first embodiment.

Hereinafter, each embodiment of the present invention will be described with reference to the diagrams. However, the present invention should not be construed as being limited to the description of the embodiments below. It is easily understood by those skilled in the art that the specific configuration can be changed without departing from the idea or the spirit of the present invention. In addition, in the configuration of the invention described below, the same portions or portions having the same functions are denoted by the same reference numerals in different diagrams, and repeated descriptions thereof may be omitted.

First Embodiment

FIG. 1 shows a configuration diagram of an unmanned aerial vehicle support system to realize the operation of an unmanned aerial vehicle support device according to a first embodiment. This system is constructed by, for example, a number of bases each of which has an unmanned aerial vehicle support device 10 where an unmanned aerial vehicle 100 used for delivering a cargo 101 takes off and lands, and a service operation server 5. In addition, in this specification, the base may be expressed as a site.

The unmanned aerial vehicle support device 10 includes a loading unit 1 that can be raised and lowered with the unmanned aerial vehicle 100 loaded thereon and a control unit that controls the elevation height of the loading unit. The control unit includes a power transmission unit 2 that raises and lowers the loading unit 1, a motor 4 that supplies power to the power transmission unit 2, an inverter 3 that converts power to drive the motor 4, and a host device 42 that communicates with the service operation server 5 through a wide area communication network 40 to send a transmitted command to the inverter 3. The host device 42 may have a configuration in which its functions are integrally implemented in the loading unit 1 and the physical host device 42 is removed. Similarly, a configuration may be adopted in which the functions of the host device 42 are integrally implemented in the inverter 3, which is a control unit.

The loading unit 1 and the control unit may include a wired or wireless communication means, and the host device 42 may be configured to monitor and collect information about the entire support device. In addition, if necessary, a limit switch 120 or the like may be provided at the final height of the upward and downward movement of the loading unit 1, and the power transmission unit 2 may be interlocked therewith to prevent the loading unit 1 from exceeding the height.

The inverter 3 receives power from a power grid 44, and a received power meter 45 such as a smart meter may be provided at the power receiving end of the site. In addition, a renewable energy generator 43 that uses sunlight or wind power may be connected to a system between the power receiving end and the inverter 3 through a similar smart meter or the like. The power information measured by these smart meter and the like may be monitored and collected by the host device 42.

In the present embodiment, the service operation server 5 is connected to the site including the unmanned aerial vehicle support device 10, a service user terminal 6, an unmanned aerial vehicle operation control system 8, a power trading market system 9, a server management terminal 49, and a site provider terminal 7 through the wide area communication network 40.

FIG. 2 is a cross-sectional view in the horizontal direction of the loading unit 1 of the unmanned aerial vehicle support device according to the first embodiment.

The loading unit 1 may include a pedestal unit 10 fixed to the power transmission unit 2 and a loading unit control unit 12 that performs management control within the loading unit 1. In addition, the loading unit 1 may include a table unit 11 that is provided separately from the pedestal unit 10 and in contact with the unmanned aerial vehicle 100 and the cargo 101, and an upper camera 14 and a lower camera 15, which are detection units capable of detecting the loading of the unmanned aerial vehicle 100 and the cargo 101 on the table unit 11. In addition, the loading unit 1 may include a post 13 for fixing the upper camera 14, a dirt removal means 16 such as a heater and a wiper for removing water left on the table unit 11 due to rain, snow, and the like.

The loading unit control unit 12 includes a board 121 having a calculation function such as a microcomputer, a wireless communication module 122, a battery 123 such as a lithium-ion battery for supplying power to the loading unit 1, a power receiving unit 124 that can charge the battery 123 from the outside, and the like. In addition, the loading unit 1 may be configured to supply power to the loading unit 1 through electric wires without using the battery 123.

The upper camera 14 and the lower camera 15, which are detection units, may be, for example, optical cameras such as a CCD, and those that can detect the movements of the unmanned aerial vehicle 100 and the cargo 101 without contact, such as a radar, a heat sensor, and a laser scanner, can be used. These may be connected to the board 121 to perform predetermined image processing. For example, the upper camera 14 may have a function of reading identification information written on the unmanned aerial vehicle 100, and the lower camera 15 may have a function of reading cargo identification information written on the cargo 101. By comparing the identification information detected by the detection units with unique information transmitted from the service operation server 5, which will be described later, it is possible to identify the unmanned aerial vehicle that is scheduled to use the system. In this manner, by identifying the unmanned aerial vehicle using the system, it is possible to specify the power consumption required for raising and lowering the unmanned aerial vehicle 100 and reflect the power consumption in calculating environmental effects or service fees. In addition, the unmanned aerial vehicle identification processing may be performed by the service operation server 5 instead of the control unit.

In addition, by analyzing images obtained from the detection units, if a diagnosis is made to detect when a small animal or the like accidentally gets on the table unit 11, it is possible to avoid the danger of accidentally raising the loading unit 1 with a small animal loaded thereon. In addition, if the loading unit 1 is configured to detect the landing or takeoff of the unmanned aerial vehicle 100, a highly safe system can be constructed by starting the raising and lowering of the loading unit 1 in conjunction with this. For example, when the detection unit detects landing or loading of an unmanned aerial vehicle on the loading unit, the loading unit is raised. Alternatively, when the detection unit detects takeoff of the unmanned aerial vehicle from the loading unit, the loading unit is lowered. In addition, by analyzing images, if a command is given to the dirt removal means 16 so that the board 121 removes tangible dirt, snow, and the like when these are accumulated on the table unit 11, it is possible to prevent erroneous detection of a proximity detection unit 18.

The wireless communication module 122 is configured to be connected to the board 121 through a connector, and can be attached and detached according to wireless communication standards (for example, LTE, Bluetooth (registered trademark), Wi-Fi (registered trademark), and Zigbee (registered trademark)) which are used for communication between the board 121 and the host device 42. In addition, the power receiving unit 124 may charge the battery 123 in combination with a charger 129 provided outside the loading unit 1. At this time, by preventing the exposure of a charging unit using a coil or the like that enables non-contact transmission in the internal circuit, it is possible to reduce the risk of electrical leakage and the like even in the case of outdoor installation.

The table unit 11 may be connected to the pedestal unit 10 through a spring unit 17, and the loading of the unmanned aerial vehicle 100 and the cargo 101 may be detected by the movement of the table unit 11. For example, a configuration may be adopted in which the proximity detection unit 18, such as a microswitch or a proximity switch, is provided between the table unit 11 and the pedestal unit 10 and this detection signal is input to the board 121. In addition, the spring unit 17 may be any mechanism as long as this is movable when the unmanned aerial vehicle 100 is loaded, and may be replaced with a hinge, an elastic body, and the like. In addition, the table unit 11 may have not only a flat surface but also a surface designed for drainage, such as a corrugated groove or grating. When the lower camera 15 is attached to the pedestal unit 10, a hole or a window may be provided in the table unit 11 to secure the field of view.

The board 121 may collect information of the voltage and current supplied from the battery 123 or power based on these, as data, or may collect power individually for attached devices such as cameras.

In addition, the loading unit 1 may have a measurement unit such as a thermometer or an anemometer, and may be configured to be able to collect measurement results such as temperature, humidity, wind speed, and wind direction, for example. The collected measurement results may be transmitted to the service operation server 5. The service operation server 5 may determine the availability of the site based on the measurement results and register or update the status in an operating status database 522, which will be described later. Alternatively, the control unit or the host device 42 may determine the availability of the site based on the measurement results and transmit the result to the service operation server 5. With such a configuration, the measurement results can be used to determine the operation or use of the site, and as a result, the use of a safe system can be realized.

FIG. 3 is a diagram showing a circuit and control block of the inverter 3 according to the first embodiment. For example, AC power of single-phase 100/200 V or three-phase 200 V supplied from the power grid 44 is converted into DC power by an AC/DC conversion circuit 31. In addition, this DC power is converted into desired AC power by power control of an inverter circuit 32 and then supplied to the motor 4.

The inverter 3 includes a calculation unit 34, which collects information of the inside of the inverter 3 and at the same time performs a control calculation using this information to operate a cooling fan 35 and power semiconductors U, V, W, X, Y, and Z forming three-phase upper and lower arms inside the inverter circuit 32. In addition, the inverter 3 includes a means for communication with the external host device 42, and the communication method may be, for example, a wired method, such as RS-485 or Ethernet (registered trademark), or a wireless method conforming to the above-described wireless communication standard.

Here, the AC/DC conversion circuit 31 may be formed by using a rectifier using a diode bridge or the like or a converter circuit using a reactor and a switching element, and may include an internal transformer for converting the voltage level as necessary. Here, line voltages Vrs and Vst, phase currents Ir and It on the input AC side of the AC/DC conversion circuit 31 or a voltage Vdc and a current Idc on the output DC side may be monitored by the calculation unit 34.

The inverter circuit 32 functions to control the current of the motor 4 so that the motor 4 rotates as desired. In general, the calculation unit 34 reads detection information of an encoder 41 that detects the rotation position or speed of the motor 4, generates a current command as a control amount using internal calculations, such as proportional-integral control, so that these match the desired target values, and generates control pulses to drive the power semiconductors U, V, W, X, Y, and Z to control the current. For example, for the motor control of the calculation unit 34, a method is known in which a plurality of control calculation blocks (not shown) such as motor position control, motor speed control, and motor torque control are provided and these are cascaded for control. Here, the inverter circuit 32 may detect output phase voltages Vu, Vv, and Vw, output phase currents Iu and Iw, temperature information Tf of a temperature sensor 33 that measures the temperature near the power semiconductor, and the like. An operation instruction Sfan for the cooling fan 35 may be always ON while the inverter 3 is operating, or may be ON and OFF based on the temperature information Tf to control the temperature Tf, for example.

In the present embodiment, the motor 4 driven by the inverter 3 is used for the purpose of raising and lowering the loading unit 1. Therefore, the inverter 3 stores gear ratio information, in which the height information of the loading unit 1 and the rotation angle information of the encoder 41 are associated with each other, in the calculation unit 34. For example, when the height command H* that is a reaching point at which the loading unit 1 rises is received through the host device 42, a difference from the previous value of the command H* may be calculated by a subtractor 341, the difference may be multiplied by a gain 342 corresponding to the gear ratio to obtain a motor rotation speed command ω*, and a difference Δω from the motor rotation speed information ω obtained from the encoder 41 may be controlled to approach zero. In addition to the method of specifying the height of the loading unit 1 using a real number, the height command H* may also be specified using a pulse train signal with a predetermined height resolution. In the latter case, a function of integrating the pulse train may be provided in the front stage of the subtractor 341. In addition, the blocks of the subtractor 341 and the gain 342 may be provided inside the host device 42, and the inverter 3 may be assigned to receive the rotation speed command ω* and perform the subsequent processing.

In addition, in recent years, technology has been used to estimate the rotation position of the motor from internal information, such as the currents Iu and Iw and the voltages Vu, Vv, and Vw, without using the encoder 41. In this case, the rotation speed information ω may be replaced with these estimated values. In addition, although the motor 4 is shown as one rotary motor in this application, there is no restriction on the form of the motor 4 as long as the function of raising and lowering the loading unit 1 is implemented. For example, a linear motor may be used, a plurality of motors may be used together, or a built-in gear may be used.

Figure 4:
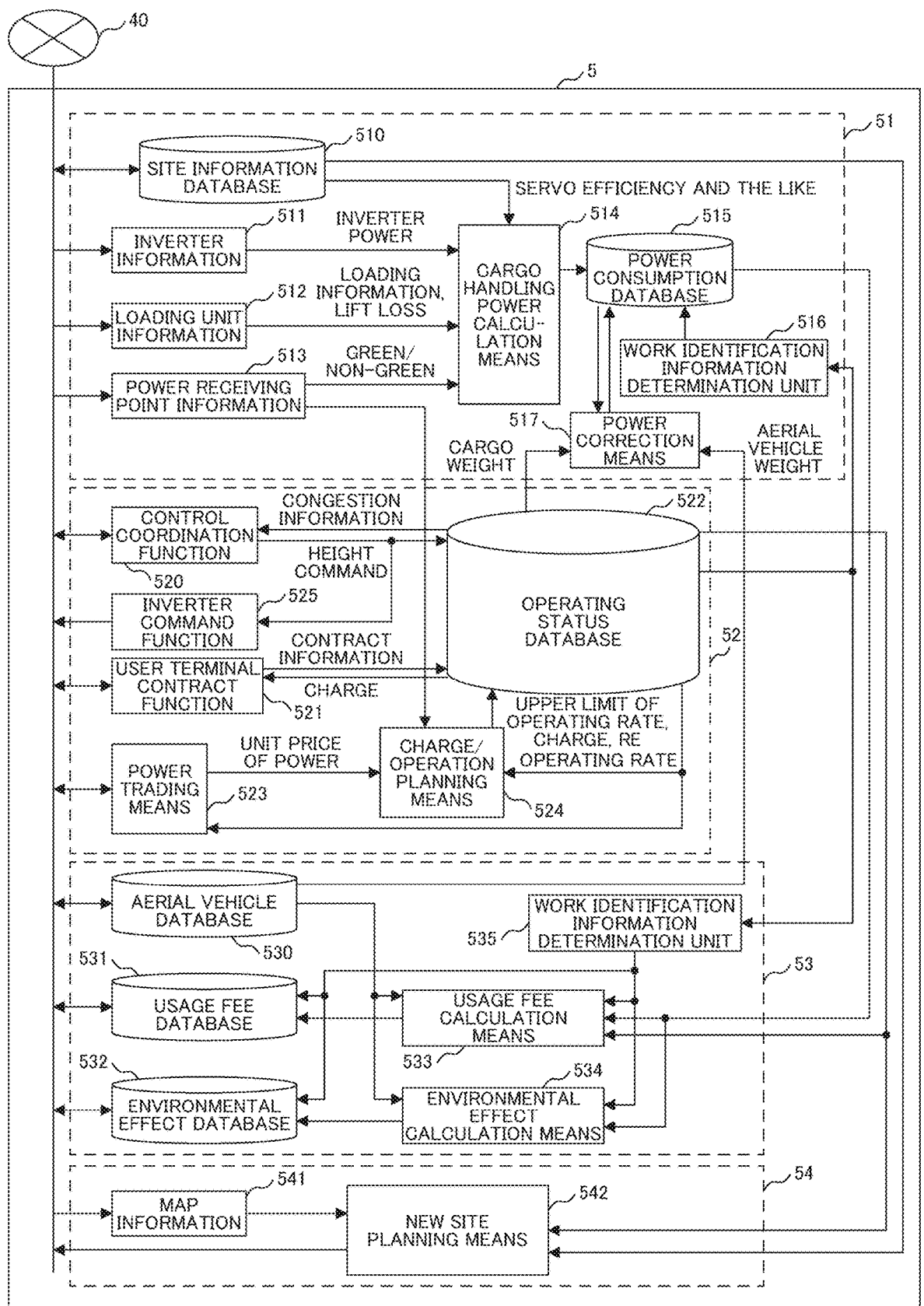
FIG. 4 is a block diagram of a service operation server according to the first embodiment.

FIG. 4 is a block diagram of the service operation server 5 according to the present embodiment. FIG. 4 shows only the calculation function of the service operation server 5, and any physical means may be used to achieve this. For example, functions may be distributed to different physical servers, or functions may be duplicated to a plurality of servers for security purposes. Alternatively, a control unit in the site may be configured to perform some of the calculations of each function.

The functions of the service operation server 5 are roughly divided into a power consumption calculation function 51, an operation reservation function 52, a charge/environmental effect calculation function 53, and a site planning operation function 54, and data transmission and reception between these and a plurality of terminals or a plurality of host devices 42 are performed through the wide area communication network 40. In addition, in this specification, the operation command is a command for instructing the control unit of an unmanned aerial vehicle support device selected by the service operation server 5 as a relay point on the air route to raise and lower the loading unit 1. The operation command may include information based on information stored in a database for each function. The control unit can control the raising and lowering of the loading unit 1 based on the operation command. Hereinafter, each function of the service operation server 5 will be described.

<Power Consumption Calculation Function>

The power consumption calculation function 51 includes a site information 510, database an inverter information collection unit 511, a loading unit information collection unit 512, a power receiving point information collection unit 513, a cargo handling power calculation means 514, a power consumption database 515, a first work identification information determination unit 516, and a power correction means 517.

The site information database 510 stores various kinds of information regarding the hardware of unmanned aerial vehicle support devices installed at a plurality of sites. The storage timing is input through the site provider terminal 7 at the service contract stage, for example. The stored information may include not only the rating, model, and image information of each hardware but also various power characteristics such as information on the power efficiency or loss characteristics of the inverter 3, the motor 4, and the charger 129, the components of the loading unit 1 and their loss characteristics, type or configuration information of the renewable energy generator 43, and device identification information of the received power meter 45. In addition, depending on the area, there may be regulations to keep unmanned aerial vehicles a predetermined distance away from people or property or to obtain the consent of the owners when flying closer than a predetermined distance. For this reason, electronic copies of documents verifying, for example, the consent of nearby property owners or residents may be stored at the time of site installation. Storing the documents on the proof of consent facilitates the process, for example, when an audit is required.

The inverter information collection unit 511 collects information when the inverter 3 is in operation through the host device 42. Examples of the information to be collected include voltage, current, power, frequency, phase, power factor, efficiency, temperature, cooling fan operating status, motor position, speed, torque, and control parameters collected and calculated by the calculation unit 34.

The loading unit information collection unit 512 collects information when the loading unit 1 is in operation through the host device 42. Examples of the information to be collected include detection information of the upper camera 14, the lower camera 15, the dirt removal means 16, and the proximity detection unit 18 and information of voltage, current, and temperature of the battery 123 and calculation parameters in the board 121. In addition, the loading unit information collection unit 512 may collect data, such as charging power, even for peripheral devices of the loading unit 1 such as the charger 129.

The power receiving point information collection unit 513 collects data of voltage, current, power, frequency, phase, power factor, and the like of the power receiving point or the renewable energy generator 43 measured by the received power meter 45 directly or through the host device 42.

As for the data collection timing of the inverter information collection unit 511, the loading unit information collection unit 512, and the power receiving point information collection unit 513, constant communication may be applied, or data temporarily recorded by the host device 42 on an hourly basis, such as one hour or one day, may be communicated at regular intervals.

The cargo handling power calculation means 514 calculates power consumption, which is required for each work determined by the first work identification information determination unit 516 to raise the unmanned aerial vehicle 100 and the cargo 101 by the loading unit 1, from the power data collected by the inverter information collection unit 511, the loading unit information collection unit 512, and the power receiving point information collection unit 513. As a result, the power consumption determined for each work can be obtained, and the charges can be calculated. In addition, the calculated amount of power is recorded in the power consumption database 515. In addition, the cargo handling power calculation means 514 may identify whether the power consumption or the amount of power at the time of the work is based on the renewable energy generator 43 or based on the power received from the power grid 44, based on the data of the received power meter 45 and record the identification result in the power consumption database 515. By identifying the power source, the environmental effects described below can be calculated.

The power correction means 517 monitors the usage status of each site regarding the power data stored in the power consumption database 515, and corrects the power data if necessary. Specifically, for example, the cargo weight at the time of contract may be obtained from the operating status database 522, which will be described later, and the aerial vehicle weight may be obtained from an aerial vehicle database 530, which will be described later, and it may be monitored whether or not the power used is equivalent to the weight of the cargo to be handled. If the power is unreasonably high, it may be determined that this is due to a malfunction in the site device, and correction to the power value corresponding to the weight may be made based on past power data. In addition, in this specification, the cargo weight and the aerial vehicle weight will be collectively referred to as cargo handling weight.

FIG. 5 shows a schematic diagram of an example of the power correction calculation of the power correction means 517. The power correction means 517 creates a power-weight map based on a database of cargo handling weight and power consumption at each site. Here, the map may be a multidimensional map that includes factors such as the rising speed of the loading unit 1 and weather conditions in addition to power and weight, and FIG. 5 shows a map when a rising speed V is fixed to a predetermined value as a third axis. For a cross section with the fixed rising speed V, the value of power relative to weight is a low-order linear function such as a first-order linear function. Therefore, for example, an evaluation power function shown by the broken line for each aerial vehicle type as shown in FIG. 5 may be learned. Then, for example, for cargo handling that can be determined as unusual power based on statistical dispersion or the like, the value may be replaced with a power value separately obtained using the evaluation power function. In addition, the conditions of the sample population for which the evaluation power function is obtained may be classified by factors that can affect the power. For example, in the case of aerial vehicle type, since air resistance specific to the unmanned aerial vehicle affects power consumption, learning may be performed by dividing the group by aerial vehicle type as shown in FIG. 5. In general, abnormal increases in power are often caused by problems in site-side devices, such as the power transmission unit 2 or the motor 4. Since these are not the fault of the service user, it is preferable to learn the evaluation power function so that it follows a group of relatively small values rather than a simple average of the population.

Since the power correction means 517 can correct power increases caused by external factors and collect charges, it is possible to construct a system that is fair to service users.

<Operation Reservation Function>

The operation reservation function 52 includes a control coordination function 520, a user terminal contract function 521, an operating status database 522, a power trading means 523, a charge/operation planning means 524, and an inverter command function 525.

The control coordination function 520 refers to the operating status database 522 and shares availability information or congestion information of each site with the unmanned aerial vehicle operation control system 8. The unmanned aerial vehicle operation control system 8 generates air route information including the unmanned aerial vehicle support device to be used as a relay point, and, if necessary, a height command to reach the loading unit 1 of the unmanned aerial vehicle support device on the air route, and transmits the air route information or the height command to the operating status database 522. The height command is generated when the height to which the loading unit 1 can rise is limited, or in consideration of the flight of other unmanned aerial vehicles, based on weather conditions or the like. In addition, the height command is generated when selecting an appropriate height in terms of energy for the unmanned aerial vehicle support device that is the next stopover point.

The user terminal contract function 521 performs an interface function related to service reservations with the service user terminal 6. When an available time slot is designated in the user's desired time slot, information on available sites and an estimated value of usage fees are presented with reference to the operating status database 522. Then, when a reservation is made at the service user terminal 6, the reservation information is stored in the operating status database 522. The reservation information may be transmitted to the site as an operation command, and the control unit may control the raising and lowering of the loading unit 1 by determining the reservation time based on the reservation information. Alternatively, the service operation server 5 may determine that the reserved time has been reached and instruct the control unit to raise or lower the loading unit 1.

The operating status database 522 manages the operating status of all sites in time series and stores, for example, whether or not there is a reservation, pricing plan for each time slot, whether or not the renewable energy generator 43 is used, and the upper limit of the operating rate or the number of operations per time slot. In managing reservations herein, it is preferable to manage the data by assigning unique work identification information for each contract and proceed with the processing based on this work identification information in a series of processes after the contract.

The power trading means 523 functions to receive unit price information for each time slot for power purchase and power sale from the power trading market system 9 and to reserve the amount of power for power purchase and power sale for each time slot. Here, when reserving the amount of power to be purchased, the amount of power consumed may be estimated from each work in the operating status database 522. Alternatively, if consignment between other sites or a contract covering a plurality of sites is possible in power trading, the amount of power to be purchased may be reserved by predicting the amount of power consumed as a total of the plurality of sites. On the other hand, a site with the renewable energy generator 43 may predict the amount of renewable energy generated and then obtain the difference between the predicted amount of renewable energy generated and the above amount of power consumed and reserve this as the amount of power sold.

The charge/operation planning means 524 stores, in the operating status database 522, operation schedule information including information of the operation limits of the service provision time, the number of times of service provision, and the operating rate at each site, whether or not renewable energy is used, and the like. For example, if an upper limit is set for the operating rate, it is possible to control, for example, the amount of power used or the amount of noise generated due to machine operation. Besides, when it is predicted that events drawing a large number of people will occur irregularly around the site, it is possible to restrict the amount of flight of unmanned aerial vehicles during the time slot. These upper limit settings for the operating rate may be based on information in the site information database 510. By adopting a configuration in which whether or not to use renewable energy is set, the service operation server 5 can propose sites that use renewable energy to users who prioritize environmental considerations. In addition, a configuration may be adopted in which a time slot in which renewable energy can be used is specified and the time slot is guided in advance. In addition, for example, when maintenance of the motor 4 is planned, the use of the planned maintenance time can be prevented by storing this time slot in the operating status database 522 as unavailable.

The inverter command function 525 transmits an operation command to the control unit at each site. In addition, when a height command regarding the loading unit 1 is received from the unmanned aerial vehicle operation control system 8, the height command is transmitted to the host device 42 at each site. Based on the height command, the loading unit 1 can be controlled to the height of the command. When the reservation information is stored in the operating status database 522, the reservation information is transmitted to the host device 42 at each site. Based on the reservation information, the timing of raising and lowering the loading unit 1 can be controlled at any time.

<Charge/Environmental Effect Calculation Function>

The charge/environmental effect calculation function 53 includes an aerial vehicle database 530, a usage fee database 531, an environmental effect database 532, a usage fee calculation means 533, an environmental effect calculation means 534, and a second work identification information determination unit 535.

The aerial vehicle database 530 stores unique information of each unmanned aerial vehicle scheduled to use the site. Examples of the unique information include aerial vehicle identification number, aerial vehicle type and model, specifications including weight, and appearance. These pieces of information may be input from the service user terminal 6 or may be obtained from the unmanned aerial vehicle operation control system 8. Alternatively, when a list of aerial vehicle information is obtained from the operator of the unmanned aerial vehicle, the service provider may input the list through the server management terminal 49.

The usage fee database 531 and the environmental effect database 532 stores charges and environmental effects for each piece of work identification information so that, when work identification information is provided from outside, this can be checked.

The usage fee calculation means 533 calculates the service usage fee for each work after the end of each work, and stores the value in the usage fee database 531. As examples of a specific service fee structure, a basic fee based on a service usage contract and a metered fee based on the level of work may be set. As the energy consumption required for raising and lowering the unmanned aerial vehicle is an important component of the metered fee, not only the amount of power for each work stored in the power consumption database 515 but also the voltage, current, power, height command value H*, motor speed $\omega$, and the like measured by the inverter 3 may be used as parameters used for this calculation.

The environmental effect calculation means 534 calculates the environmental effect for each work after the end of each work, and stores the result in the environmental effect database 532. The environmental effect herein may be an effect of reducing greenhouse gas emissions when the power required for work is changed from fossil fuel-derived power received from the power grid 44 to power derived from the renewable energy generator attached to the site. In addition, the environmental effect may be a difference between a value obtained by converting the estimated energy consumption when the unmanned aerial vehicle rises with its own rising ability into primary energy or greenhouse gas emissions and a value obtained by converting the actual energy consumption of the unmanned aerial vehicle support device into primary energy or greenhouse gas emissions. In this manner, the environmental effects of using the unmanned aerial vehicle support device that uses renewable energy can be visualized for users who are concerned about the environment.

Due to the charge/environmental effect calculation function 53, not only can the service usage fee be calculated, but also the loss of the entire system, including power consumption due to auxiliary power, can be evaluated over the entire life cycle necessary for calculating environmental indicators.

<Site Planning Operation Function>

The site planning operation function 54 includes a map information acquisition means 541 and a new site planning means 542.

The map information acquisition means 541 acquires information on the installation environments of sites currently participating in the support service, topography, properties, and population dynamics of their surrounding areas from a predetermined map data information source.

The new site planning means 542 extracts an area where sites with high operating rates are concentrated from among the sites currently participating in the support service based on the accumulated data of the site information database 510 and the operating status database 522. Then, the new site planning means 542 searches for a place where a new site can be constructed near the extracted area with a high operating rate. When a desirable place is found, changes in the operating rates of surrounding sites when the new site is constructed in the place are analyzed, and predicted values of the operating rates due to the new site are calculated.

When selecting sites with high operating rates, sites with the highest operating rates may be extracted from among all sites. Alternatively, a divided value obtained by dividing the operating rate by the area of a circle whose radius is the minimum distance between adjacent sites may be used as an index. Alternatively, the map may be divided into triangles whose nodes are the coordinates of each site on the map data, and then triangles in which the average operating rate of the apex sites of each triangle is larger than those of other triangles may be extracted. Alternatively, a divided value obtained by dividing the average operating rate of each triangle by the area of each triangle may be used as an index. In addition, the new site plan may be selected based not only on the site's operating rate but also on sales balance or environmental effects.

A construction area for a new site may be searched for according to a combination of a plurality of conditions related to unmanned aerial vehicle operations, such as whether there is any building at the flight altitude of the unmanned aerial vehicle, whether or not there is any densely populated area nearby, whether or not there is any open space that meets the separation distance stipulated by laws and regulations related to unmanned aerial vehicles, and whether or not there is any renewable energy generation facility nearby that can be connected. Alternatively, when a specific candidate location is planned in advance, the coordinates may be input to determine whether or not these conditions are met.

Due to the site planning operation function 54, it is possible to assist site providers in creating new businesses by predicting candidate locations for new sites and their return on investment. In addition, the construction of new sites can eliminate bottlenecks in the operating rate.

As described above, the host device 42 acquires the operation command obtained from each function of the service operation server 5 and transmits the operation command to the control unit. Then, based on the operation command, the control unit can control the raising and lowering of the loading unit 1 at the site requested to be used. As a result, since the unmanned aerial vehicle 100 can be flown from the high altitude using the unmanned aerial vehicle support device, it is possible to reduce the consumption of stored energy in the unmanned aerial vehicle 100 required for raising the unmanned aerial vehicle 100 and accordingly to increase the cruising distance. In addition, since the consumption of stored energy can be reduced, the heavier cargo 101 can also be transported in the same transport section.

Second Embodiment

As a second embodiment, functional blocks of a service user terminal will be described. FIG. 6 shows a functional block diagram of the service user terminal 6. Here, the service user may be not only an individual or organization that uses a delivery service using unmanned aerial vehicles but also an individual or organization that operates a delivery service. The service user terminal 6 may be physically a PC or mobile terminal including an input means such as a screen and a keyboard, and the functions shown in FIG. 6 may be implemented as applications that mainly function as operation interfaces on a terminal with an OS. The service user terminal 6 has an initial setting function 61, a usage power type setting function 62, a site usage reservation function 63, a cargo information input function 64, an aerial vehicle information input function 65, a cargo handling tracking information display function 66, and a payment information display function 67. In addition, although the use in delivery is described as an example, this system is not limited to delivering the cargo 101, but can also be used for transportation of unmanned aerial vehicles in the event of a disaster, for example.

The initial setting function 61 inputs user-specific settings, for example, the location of the user's business base, availability of renewable energy, and a payment method at the time of payment, such as bank account and card information.

The usage power type setting function 62 is a screen for resetting whether or not to use renewable energy for each work, and is used when making a request different from the initial settings.

The site usage reservation function 63 executes an inquiry about the use of a desired site and a reservation application according to a reservation screen to be described later.

The cargo information input function 64 is a screen for notifying of the contents of the cargo, such as weight, size, and contents, when these can be specified in advance. This function is effective, for example, when the size is so large that loading on the general loading unit 1 is not possible or when the weight exceeds the lifting capacity of the general motor 4. Based on this information, it may be determined whether or not a contract using the user terminal contract function 521 is possible. In addition, the weight information can also be used in the charge/environmental effect calculation function 53.

The aerial vehicle information input function 65 is a screen for registering the information of unmanned aerial vehicles owned and used in advance in the aerial vehicle database 530. When points for various services are awarded based on the number of times each unmanned aerial vehicle is used, this function may be configured such that the points can be checked.

The cargo handling tracking information display function 66 is a screen for displaying the progress status of contracted work. For example, it is sufficient to have a function of displaying a progress display screen that shows 100% of the progress with a linear or arc-shaped gauge and then shows the progress of processed work with color or a function of displaying guidance on the next work that the user should perform when using the site.

The payment information display function 67 is a screen for checking and viewing the cost and environmental impact of the contracted work after the completion of the work.

Figure 7:
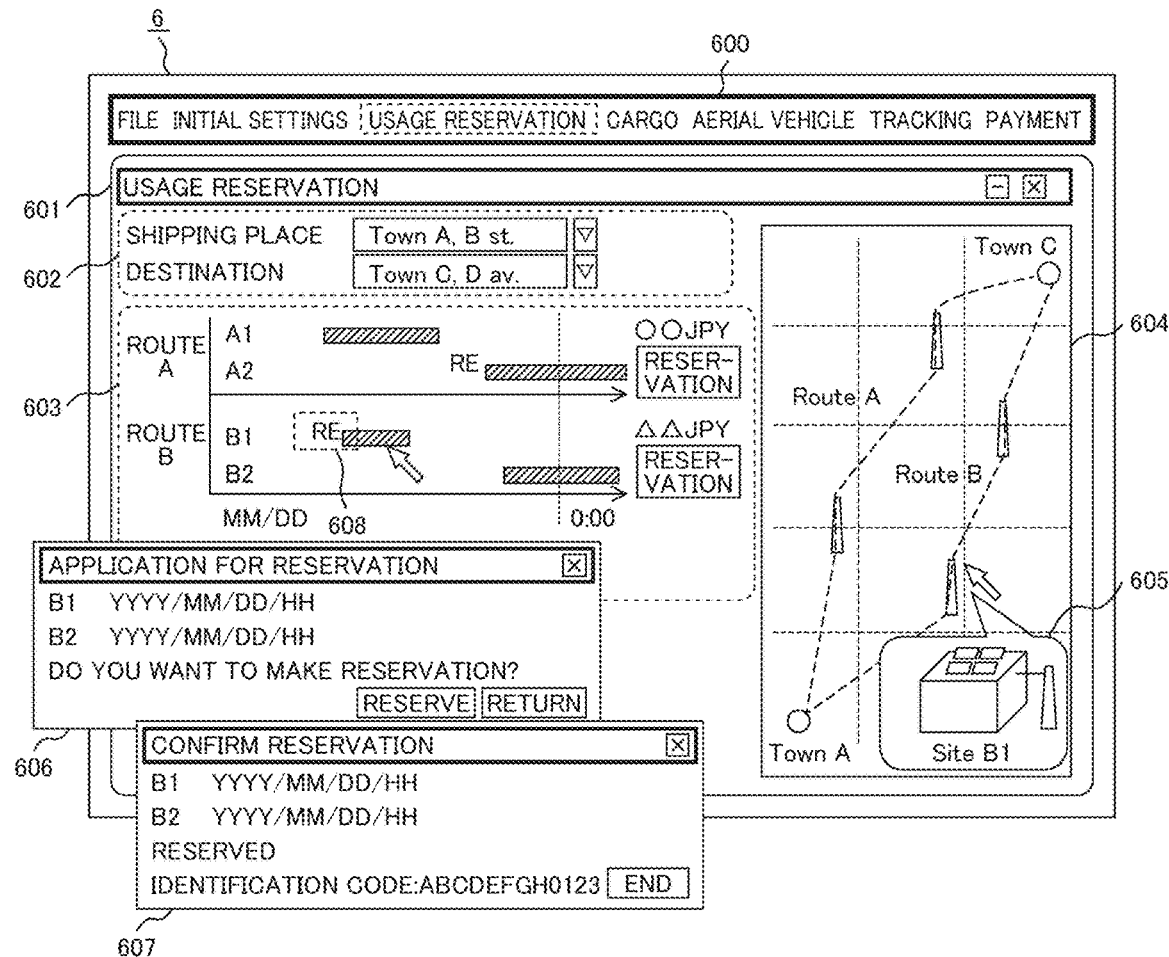
FIG. 7 is an example of a screen of the service user terminal according to the second embodiment.

FIG. 7 shows an example of the screen configuration of the service user terminal 6 according to the second embodiment. A menu bar section 600 may be provided at the top of the screen and a function display section 601 may be provided at the bottom of the screen, so that the function display section 601 is switched in conjunction with the selection on the menu bar section 600. The function display section 601 in FIG. 7 particularly displays the contents of the site usage reservation function 63, but detailed screens such as the initial setting function 61 and the cargo information input function 64 can also be displayed.

The function display section 601 of the site usage reservation function 63 has a delivery condition input section 602 at the upper left of the screen, a delivery condition selection display section 603 at the lower left of the screen, and a delivery route display section 604 at the right of the screen.

The delivery condition input section 602 includes a text box or a pull-down menu in which two points related to the delivery conditions (movement conditions) of, for example, a departure point and a destination, can be entered. These inputs may be, for example, not only location/address information but also any coordinate information, such as latitude and longitude.

The delivery condition selection display section 603 extracts site information suitable for the delivery condition input section 602 from the operating status database 522 through the user terminal contract function 521 and the site usage reservation function 63, and displays this as schedule information along the time axis. When a plurality of suitable sites are selected as candidates herein, a plurality of delivery route candidates, such as route A and route B, may be displayed on the screen. In addition, when the destination is far away, a route for relaying a plurality of sites may be set, and this may be displayed in a plurality of stages such as sites A1 and A2 in the route A, for example. In addition, the time axis may be indicated by a horizontal line segment, and the available time slot during which each site can be operated may be indicated by colored bands parallel to the time axis. In addition, when renewable energy is expected to be used in each free time slot at each site, an identification code indicating this may be added to each slot (in FIG. 7, the identification code is indicated by character display 608 of RE). In addition, the approximate amount of the usage fee when using each delivery route may be indicated for each delivery route, such as ○○ yen or ΔΔ yen. Here, for example, a plurality of amounts may be displayed for each site, or only one amount equivalent to the total site amount used for each delivery route may be displayed. Therefore, the user can select a delivery route candidate suitable for the user's purpose from among a plurality of delivery routes. For example, when the user uses renewable energy, route candidates including sites that use renewable energy may also be displayed.

In addition, a push button displaying "Reservation" for each delivery route may be provided in the delivery condition selection display section 603, so that a reservation application confirmation screen 606 corresponding to the route is popped up when the button is pressed. On the reservation application confirmation screen 606, a confirmation message "Do you want to make a reservation?" operation and buttons, such as "Reservation" and "Back", may be provided together with the site usage time slot information for the selected delivery route, so that the reservation is confirmed by pressing the "Reservation" button.

After the user terminal contract function 521 finishes processing the contract operation on the reservation application confirmation screen 606, the contracted details may be displayed on the reservation confirmation display screen 607, or an identification code related to the contracted work may be displayed on this screen to prompt the user to later check the work using the identification code.

On the delivery route display section 604, for example, a layer displaying two-dimensional or three-dimensional map data and a layer, in which a model displaying a shipping place, a destination, and a site location, lines for connections between sites, and the like are arranged, may be displayed so as to overlap each other, so that the user can intuitively predict the trajectory of cargo movement. In addition, when a cursor of a mouse or the like is moved near the model of the site, a site details display 605 may be popped up. For example, site information such as a photo is displayed so that the user can recognize information such as whether or not the site includes a renewable energy generator in its facility. In addition, this pop-up may be displayed in conjunction with the proximity of the cursor to each site information in the delivery condition selection display section 603.

Third Embodiment

Figure 8:
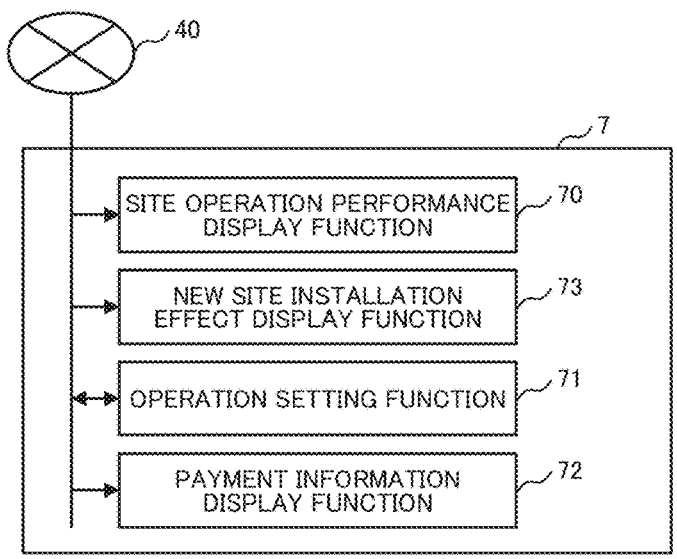
FIG. 8 is a functional block diagram of a site provider terminal according to a third embodiment.

As a third embodiment, functional blocks of a site provider terminal will be described. FIG. 8 shows a functional block diagram of the site provider terminal 7. Here, the site provider refers to, for example, an individual, company, or association that owns or has the right to commercially use the site, and may be, for example, a building management company or a management association for an apartment complex. In addition, when a delivery company using unmanned aerial vehicles owns a site, the service user may also serve as the site provider. The site provider terminal 7 may be physically a PC or mobile terminal including an input means such as a screen and a keyboard, and the functions shown in FIG. 8 may be implemented as applications that mainly function as operation interfaces on a terminal with an OS. The site provider terminal 7 includes a site operation performance display function 70, a new site installation effect display function 73, an operation setting function 71, and a payment information display function 72.

The site operation performance display function 70 is a means for displaying the general operation performance of the site provided by the site provider, and displays, for example, daily and hourly operation schedules, statistics on user attribute information, and the like.

The new site installation effect display function 73 displays changes in operating status when a new site is installed at a suitable location, based on site information provided by the site provider or other kinds of site information.

The operation setting function 71 is a function for inputting information regarding the site information database 510. For example, operation schedule information related to operation, such as the start time or stop time of service provision in the site, the number of times the service can be used, and the maximum operating rate for each predetermined time slot, is set. In addition, as information regarding the site information database 510, information on whether to use other power services during time slots other than operating hours may be included. In addition, it would be good to be able to set the registration of electronic copies of documents verifying the consent of nearby property owners or residents and the presence or absence of optional contracts regarding various kinds of power trading such as the renewable energy generator 43. For example, by storing document data corresponding to regulations in each area, work can proceed smoothly when an audit is required.

The payment information display function 72 is a display screen on which information about service fees paid to the site provider can be viewed.

Figure 9:
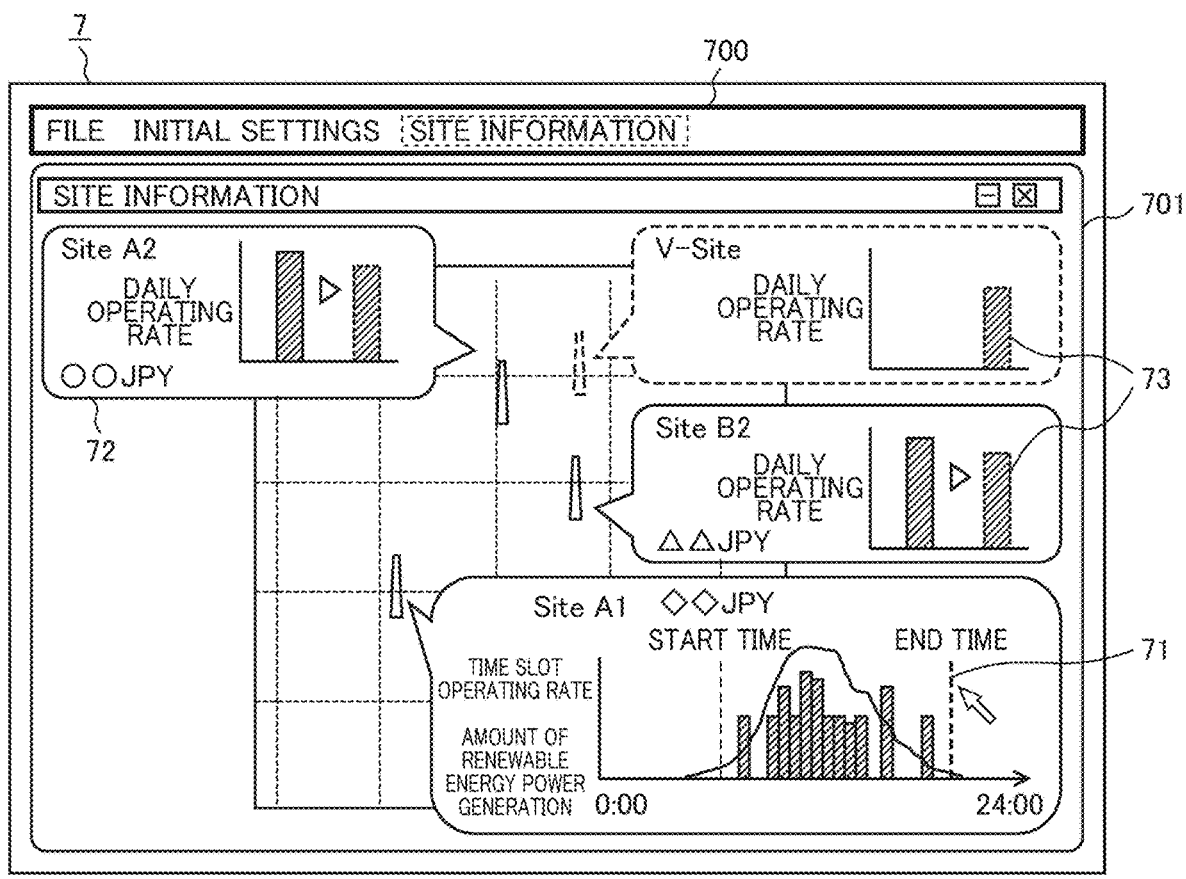
FIG. 9 is an example of a screen of the site provider terminal according to the third embodiment.

FIG. 9 is an example of a screen configuration showing an example of the site provider terminal 7 according to the third embodiment. The site provider terminal t 7 has a screen configuration including a menu bar section 700 and a details display section 701 at the top of the screen. For example, the site provider terminal 7 may have a configuration in which a two-dimensional or three-dimensional map information layer and a layer displaying the model of the site owned by the provider are displayed so as to overlap each other, and each site model is configured so that site details information 72 can be displayed, for example, in a pop-up or a speech bubble. Here, the site details information 72 displays not only a bar graph showing the operating rate per day or a more detailed unit of time but also the operating income per unit time. In a site including the renewable energy generator 43, the amount of power generated may be displayed as a trend graph, such as a broken line, on a graph with the time on the horizontal axis. On the graph with the time on the horizontal axis, for example, the service start time, the service end time, and the like set in advance by the site provider may be displayed. For example, if these set times can be changed by an operation such as dragging the display of these times and moving the display in the time axis direction, it becomes easy to set the service time linked to the renewable energy generator 43.

In addition, as shown by V-Site in FIG. 9, a site that does not currently exist on the map may be displayed as a virtual site (new site), which is a virtual unmanned aerial vehicle support device, using a broken line, for example. At the same time, in the operating rate information of the currently existing site, the predicted value of the operating rate when a virtual site is installed and the current value may be displayed side by side so that these can be compared with each other. For example, it is possible to easily check the changes when a new site is installed in an area with a high operating rate.

Fourth Embodiment

Figure 10:
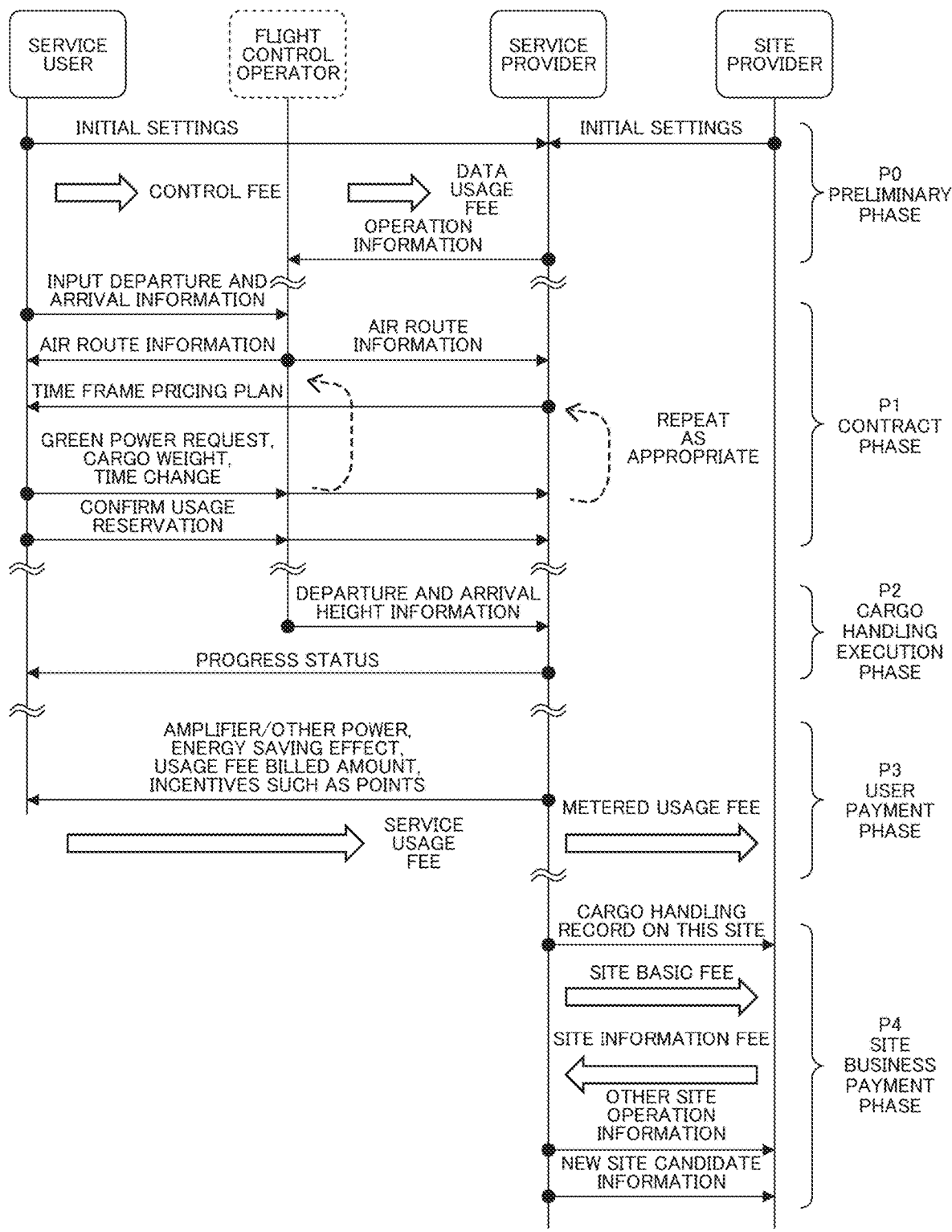
FIG. 10 is a work procedure chart for an unmanned aerial vehicle support device operation service according to a fourth embodiment.

As a fourth embodiment, a work procedure using an unmanned aerial vehicle support device operation service will be described. FIG. 10 is a work procedure chart for the unmanned aerial vehicle support device operation service, and shows the flows of information exchanged among the four parties (service user, flight control operator, service provider, and site provider) of this service and various fees. The flight control operator operates an unmanned aerial vehicle operation control system 8, and the service provider operates the service operation server 5. In addition, the service user has the service user terminal 6, and the site provider has the site provider terminal 7. The work procedure chart can be broadly divided into a preliminary phase P0, a contract phase P1, a cargo handling execution phase P2, a user payment phase P3, and a site business payment phase P4. In addition, the service user and the flight control operator may be the same entity. For example, a case where a business whose main business is transportation owns and operates both an unmanned aerial vehicle and a flight control system corresponds to this example. In addition, there may also be a case where the service provider also serves as a site provider that owns its own site.

In the preliminary phase P0, the service user and the site provider each input initial setting information to the service provider (service operation server 5). In addition, the flight control operator ((unmanned aerial vehicle operation control system 8) acquires operational information from the service provider and pays a data usage fee as compensation.

Then, in the contract phase P1, the service user inputs the departure and arrival information and delivery conditions regarding the unmanned aerial vehicle 100 and the cargo 101 from his/her own terminal, the flight control operator generates predetermined air route information based on this content, and the service provider presents the air route information and pricing plans based on the air route information to the service user. On the other hand, the service user provides not only the presented information, such as these pricing plans, but also optional requests, such as availability of renewable energy, cargo weight, and time changes, to the flight control operator and the service provider as updated information, thereby creating a cycle to review these as appropriate. Thereafter, when the reservation is confirmed by the service user, the flight control operator and the service provider are notified of this to make a contract.

Then, in the cargo handling execution phase P2, the flight control operator sends, to each site, about the site usage schedule, the arrival of the unmanned aerial vehicle 100 based on the weather conditions of the day, and a takeoff height command, and the like through the service operation server 5.

Then, in the user payment phase P3, the service user is notified of the power consumption and environmental effects generated at each site in the cargo handling execution phase P2, and a notification is sent to charge for the use of each service. The cost is paid by the service user to the service provider as a usage fee, and a part of this is refunded to the site provider as a metered usage fee.

Finally, the site business payment phase P4 may occur irregularly in the series of flows. The service provider sends regular operation records to the site provider as a record, and also pays the basic fee for the service.

Fifth Embodiment

Figure 11:
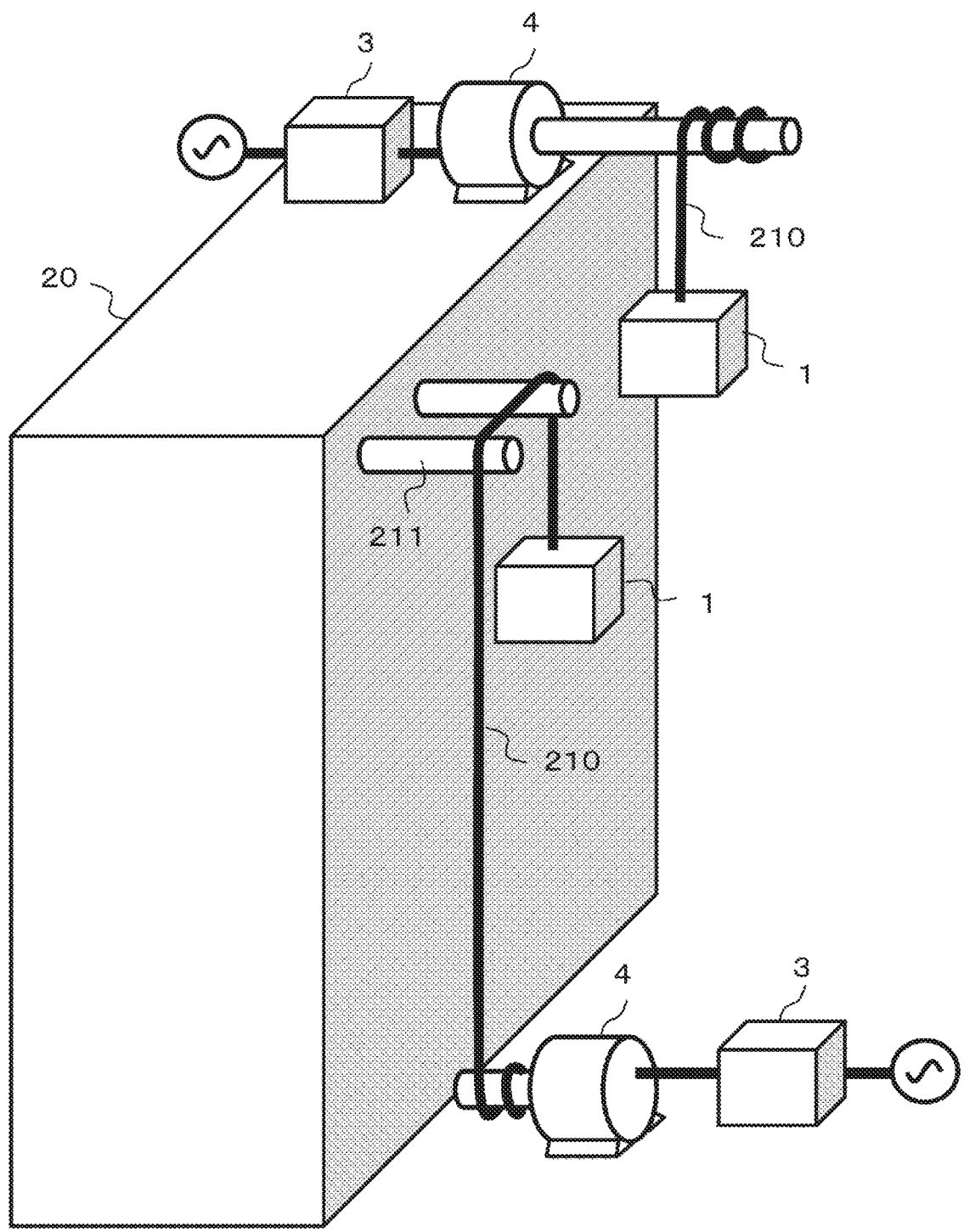
FIG. 11 is a first modification example of the unmanned aerial vehicle support device.

As a fifth embodiment, modification examples of an unmanned aerial vehicle support device will be described. FIG. 11 is a three-dimensional schematic diagram specifically showing a lifting mechanism according to a first modification example of the unmanned aerial vehicle support device. A power transmission unit 2 connects a rotating unit of the motor 4 and the loading unit 1 to each other with a cable-like object 210 (cable-like unit) such as a rope or a chain. Then, the motor 4 may be installed at the top of a high-rise building 20 to wind up the loading unit 1, or a column 211 including a fixed pulley and the like may be installed at the top of the high-rise building 20 and the motor 4 may be installed at the bottom to raise the loading unit 1 using the pulley mechanism. In addition, the inverter 3 may be arranged in the same manner as the motor 4. In addition, the material of the cable-like unit may be steel, resin, fiber, or the like.

Figure 12:
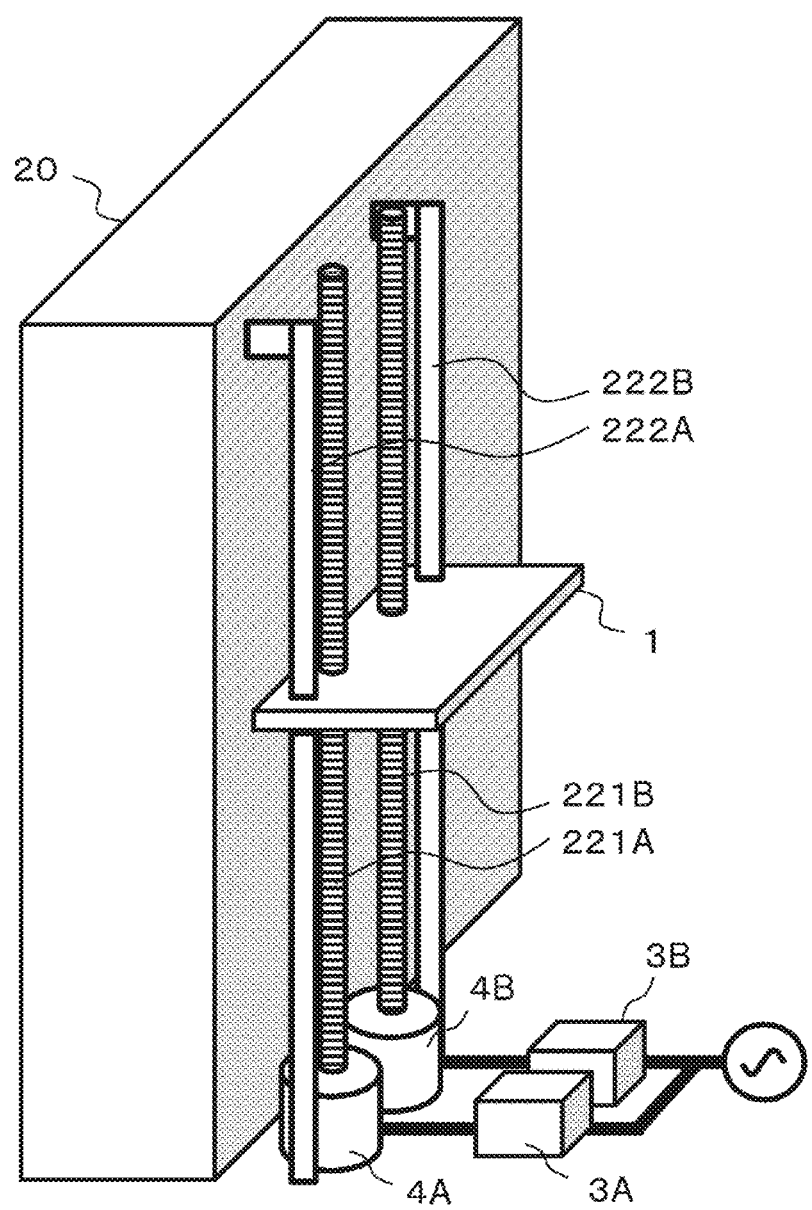
FIG. 12 is a second modification example of the unmanned aerial vehicle support device.

FIG. 12 is a three-dimensional schematic diagram specifically showing a lifting mechanism according to a second modification example of the unmanned aerial vehicle support device. The power transmission unit 2 is a rotating threaded unit 221, the loading unit 1 including a ball screw mechanism is configured to be able operate approximately perpendicularly to the threaded unit 221, and the threaded unit 221 is arranged upright in the direction of gravity. In addition, when there is a high-rise building 20 nearby, a slide guide 222 that is approximately parallel to the threaded unit 221 may be provided, and a part of the slide guide 222 may be configured to be fixed to the high-rise building 20. In addition, in FIG. 12, a two-axis propulsion system is shown in which one loading unit 1 is driven by two motors 4, and subscripts A and B are attached to devices that make up each axis.

Figure 13:
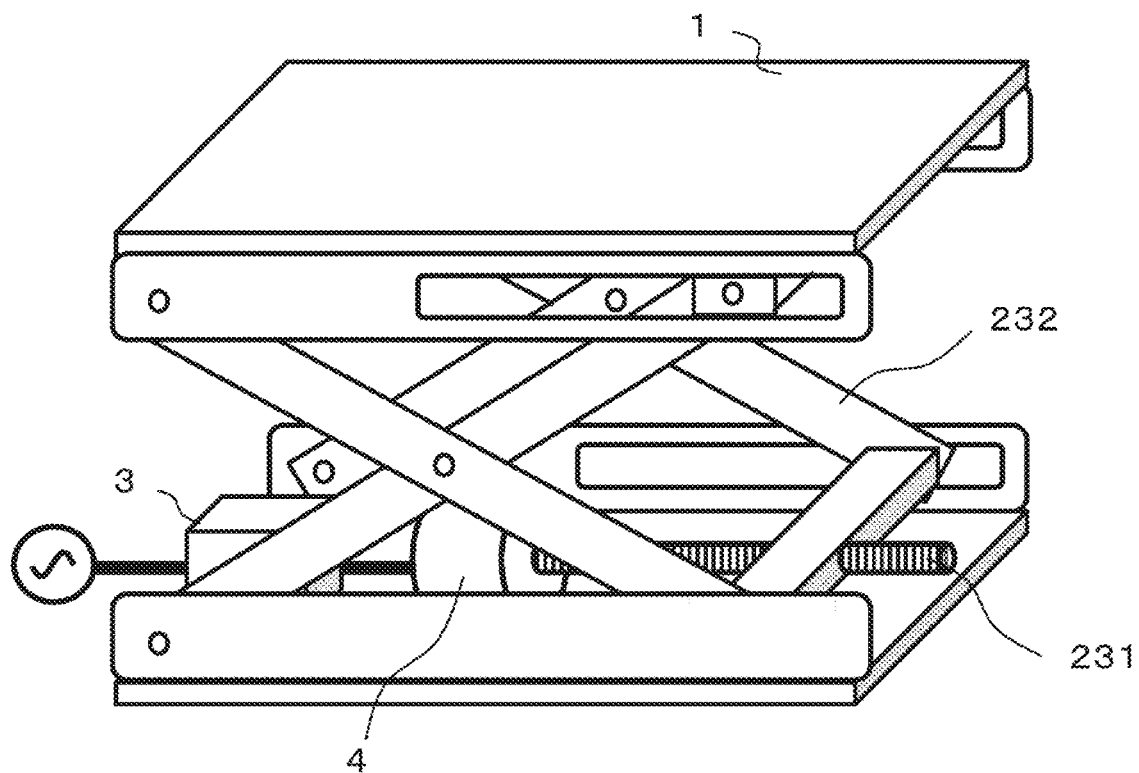
FIG. 13 is a third modification example of the unmanned aerial vehicle support device.

FIG. 13 is a three-dimensional schematic diagram specifically showing a lifting mechanism according to a third modification example of the unmanned aerial vehicle support device. The power transmission unit 2 is a rotating threaded unit 231, and is configured such that the loading unit 1 is moved up and down through a pantograph arm 232 by a ball screw mechanism. Even in this configuration, a slide guide supported by a nearby high-rise building may be provided as shown in FIG. 12.

Figure 14:
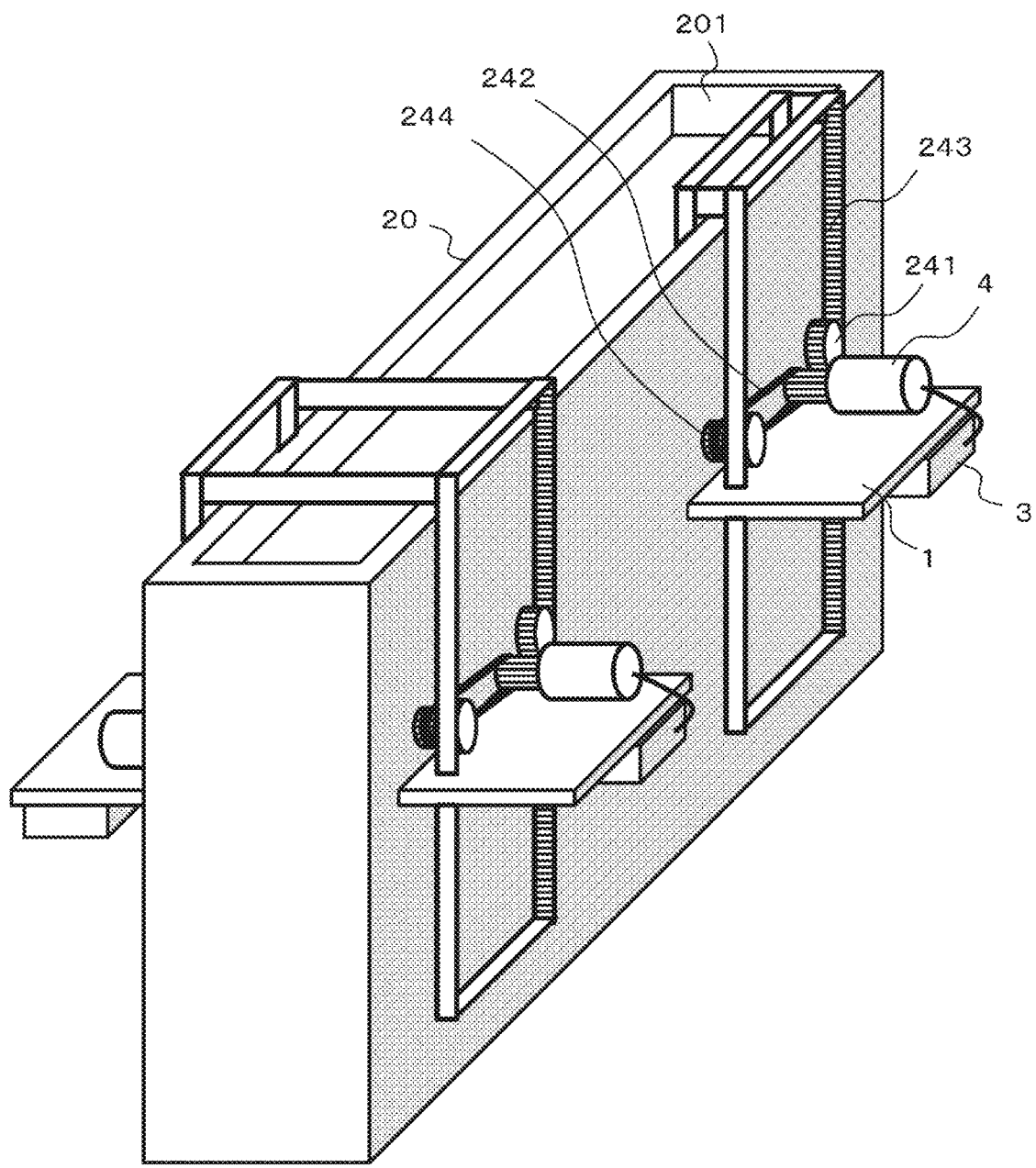
FIG. 14 is a fourth modification example of the unmanned aerial vehicle support device.

FIG. 14 is a three-dimensional schematic diagram specifically showing a lifting mechanism according to a fourth modification example of the unmanned aerial vehicle support device. In this configuration, the motor 4 and the inverter 3 are loaded on the loading unit 1, and the motor 4 is configured to include its own weight as a load related to raising the loading unit 1. The high-rise building 20 has a rack 243 installed in a direction approximately perpendicular to the wall thereof, and a pinion gear 241 connected to the motor 4 fits into the groove carved in the rack 243 so that the loading unit 1 can move up and down. In addition, in FIG. 14, there are two racks 243, and a belt 242 and a pulley 244 are provided on the other rack 243 to simultaneously transmit the power of the motor 4. In addition, instead of fixing the rack 243 to the wall of the high-rise building 20, the rack 243 may be suspended from the top 201. In addition, in the case of the high-rise building 20 having approximately parallel surfaces, the rack 243 and the loading unit 1 may be provided on both the surface and the opposite surface, respectively, to prevent uneven load due to suspension. In addition, in this configuration, the inverter 3 is also loaded on the loading unit 1. For this reason, an electric wire (not shown) for supplying power to the inverter 3 may be connected to the loading unit 1 from the outside, or a power storage means that can be charged from an external power source may be provided in the loading unit 1 to be used as the power for the inverter 3.

The configurations shown in FIGS. 11 to 14 are just examples, and any configuration can be applied, without being limited to these configurations, as long as the loading unit 1 can be raised and lowered by the power of the motor 4 similarly to the configurations. In addition, a transmission means for relaying, such as a gear or oil pressure, may be provided at each power transmission node. In addition, the high-rise building 20 may be a commercial building, an apartment complex, a factory building, plant equipment, installation towers for power transmission lines, broadcasting, communication, weather observation equipment, suspension bridges, cranes, cable cars, etc., a lighthouse, a gazebo, a pier, a wind power generation facility, and the like. Terrain with height differences such as a cliff can also be used as a substitute.

In addition, the present invention is not limited to the embodiments described above, and includes various modification examples. For example, the above embodiments have been described in detail for easy understanding of the present invention, but the present invention is not necessarily limited to having all the components described above. In addition, some of the components in one embodiment can be replaced with the components in another embodiment, and the components in another embodiment can be added to the components in one embodiment. In addition, for some of the components in each embodiment, addition, removal, and replacement of other components are possible.

In addition, although the present invention is for raising the unmanned aerial vehicle and making the unmanned aerial vehicle take off from the higher altitude, unmanned aerial vehicles that can not only take off and land vertically but also glide using wings have been developed in recent years. Therefore, by combining the unmanned aerial vehicle support device of the present invention with wing-based gliding, it is possible to further suppress the stored energy consumption of the storage battery installed in the unmanned aerial vehicle.

REFERENCE SIGNS LIST

1 Loading unit
2 Power transmission unit

3 Inverter
4 Motor
5 Service operation server
6 Service user terminal
7 Site provider terminal
8 Unmanned aerial vehicle operation control system
9 Power trading market system
10 Unmanned aerial vehicle support device
100 Unmanned aerial vehicle
101 Cargo
40 Wide area communication network
42 Host device
43 Renewable energy generator
44 Power grid
45 Received power meter
51 Power consumption calculation function
510 Site information database
511 Inverter information collection unit
512 Loading unit information collection unit
513 Power receiving point information collection unit
514 Cargo handling power calculation means
515 Power consumption database
516 First work identification information determination unit
517 Power correction means
52 Operation reservation function
520 Control coordination function
521 User terminal contract function
522 Operating status database
523 Power trading means
524 Charge/operation planning means
525 Inverter command function
53 Charge/environmental effect calculation function
530 Aerial vehicle database
531 Usage fee database
532 Environmental effect database
533 Usage fee calculation means
534 Environmental effect calculation means
535 Second work identification information determination unit
54 Site planning operation function
541 Map information acquisition means
542 New site planning means

The invention claimed is:

1. An unmanned aerial vehicle support system, comprising:
an unmanned aerial vehicle support device that includes a loading unit on which an unmanned aerial vehicle is loaded and a control unit that controls raising and lowering of the loading unit and raises the loading unit to a predetermined height to enable the unmanned aerial vehicle to take off;
a server that is able to communicate with the unmanned aerial vehicle support device and selects a route on which the unmanned aerial vehicle flies and one or more unmanned aerial vehicle support devices on the route based on movement information including at least a departure point and a destination of the unmanned aerial vehicle input from an outside; and
a user terminal that is connected to the server through a network to input cargo weight information,
wherein the server calculates net power information consumed for raising the unmanned aerial vehicle based on power information measured inside the control unit and power information measured inside the loading unit,
wherein the server corrects the net power information consumed for raising the unmanned aerial vehicle using the cargo weight information.

2. The unmanned aerial vehicle support system according to claim 1,
wherein the loading unit includes a detection unit that detects the unmanned aerial vehicle loaded on the loading unit, and
wherein the control unit controls raising and lowering of the loading unit based on a detection result of the detection unit.

3. The unmanned aerial vehicle support system according to claim 2,
wherein the control unit raises the loading unit when the detection unit detects landing or loading of the unmanned aerial vehicle on the loading unit.

4. The unmanned aerial vehicle support system according to claim 2,
wherein the control unit lowers the loading unit when the detection unit detects takeoff of the unmanned aerial vehicle from the loading unit.

5. The unmanned aerial vehicle support system according to claim 1, further comprising:
a storage battery capable of supplying power to the loading unit; and
a means for charging the storage battery.

6. The unmanned aerial vehicle support system according to claim 1,
wherein the control unit includes:
a motor that drives the loading unit up and down; and
an inverter that supplies power to the motor and controls rotation of the motor.

7. The unmanned aerial vehicle support system according to claim 1,
wherein the unmanned aerial vehicle support device is located at a relay point on the route on which the unmanned aerial vehicle flies.

8. The unmanned aerial vehicle support system according to claim 1,
wherein the loading unit includes a detection unit that detects the unmanned aerial vehicle loaded on the loading unit,
wherein the detection unit detects identification information of the loaded unmanned aerial vehicle,
wherein the movement information includes identification information of the unmanned aerial vehicle reserved for loading onto the loading unit, and
wherein the control unit controls raising and lowering of the loading unit when the identification information of the loaded unmanned aerial vehicle matches the identification information of the unmanned aerial vehicle reserved for loading onto the loading unit.

9. The unmanned aerial vehicle support system according to claim 1,
wherein the server transmits reservation information that is a time to raise and lower the loading unit, and
wherein the control unit controls the loading unit based on the reservation information.

10. The unmanned aerial vehicle support system according to claim 1,
wherein the server transmits a height command to give an instruction for a height to which the loading unit is raised, and
wherein the control unit raises the loading unit based on the height command.

11. The unmanned aerial vehicle support system according to claim 1, wherein the unmanned aerial vehicle support device includes a renewable energy generation facility, and wherein the server calculates a power component supplied from the renewable energy generation facility from power consumption or an amount of power consumption of the unmanned aerial vehicle support device required for raising the loading unit and transmits the calculated power component to the outside.

12. The unmanned aerial vehicle support system according to claim 1, wherein the server predicts changes in at least one of an operating rate, a sales balance, and environmental effects of the unmanned aerial vehicle support device when a new unmanned aerial vehicle support device is installed, and outputs candidate locations and a prediction result.

* * * * *